United States Patent [19]

Tashman et al.

[11] 4,216,845

[45] Aug. 12, 1980

[54] CIRCULAR FOOD SERVICE CONVEYOR

[76] Inventors: Philip Tashman; Vito M. Onori, both of 7500 NW. 41 St., Miami, Fla. 33136

[21] Appl. No.: 934,345

[22] Filed: Aug. 17, 1978

[51] Int. Cl.² .............................................. B65G 15/02
[52] U.S. Cl. ........................................ 186/49; 198/831
[58] Field of Search ............ 186/1 AR, 1 AW, 1 AE, 186/1 M, 1 AA; 198/793, 831, 836, 854

[56] References Cited

U.S. PATENT DOCUMENTS

| | | | |
|---|---|---|---|
| 2,037,815 | 4/1936 | Ora | 186/1 AR |
| 3,788,455 | 1/1974 | Dieckmann, Jr. | 198/831 |

*Primary Examiner*—Stanley H. Tollberg
*Attorney, Agent, or Firm*—Ernest H. Schmidt

[57] ABSTRACT

A portable self-supporting food service conveyor has an elongated rectangular table top supported at each end by box-like pedestal enclosures and in the top of which there is a circular tracking slot within which is removably received an articulated-slat conveyor belt. Centrally supported above the table top are a pair of vertically-spaced, rectangular shelf members for the temporary storage of condiments and other food portions to be placed on removable trays carried by the conveyor belt. One of the support pedestals houses electric drive mechanism for sprocket drive from underneath of a sprocket chain comprising the articulated conveyor belt and projecting through the conveyor tracking slot. The other pedestal houses a refrigerating compressor and evaporator system associated with a cooling coil serving to refrigerate a portion of one of the food holding shelves.

11 Claims, 15 Drawing Figures

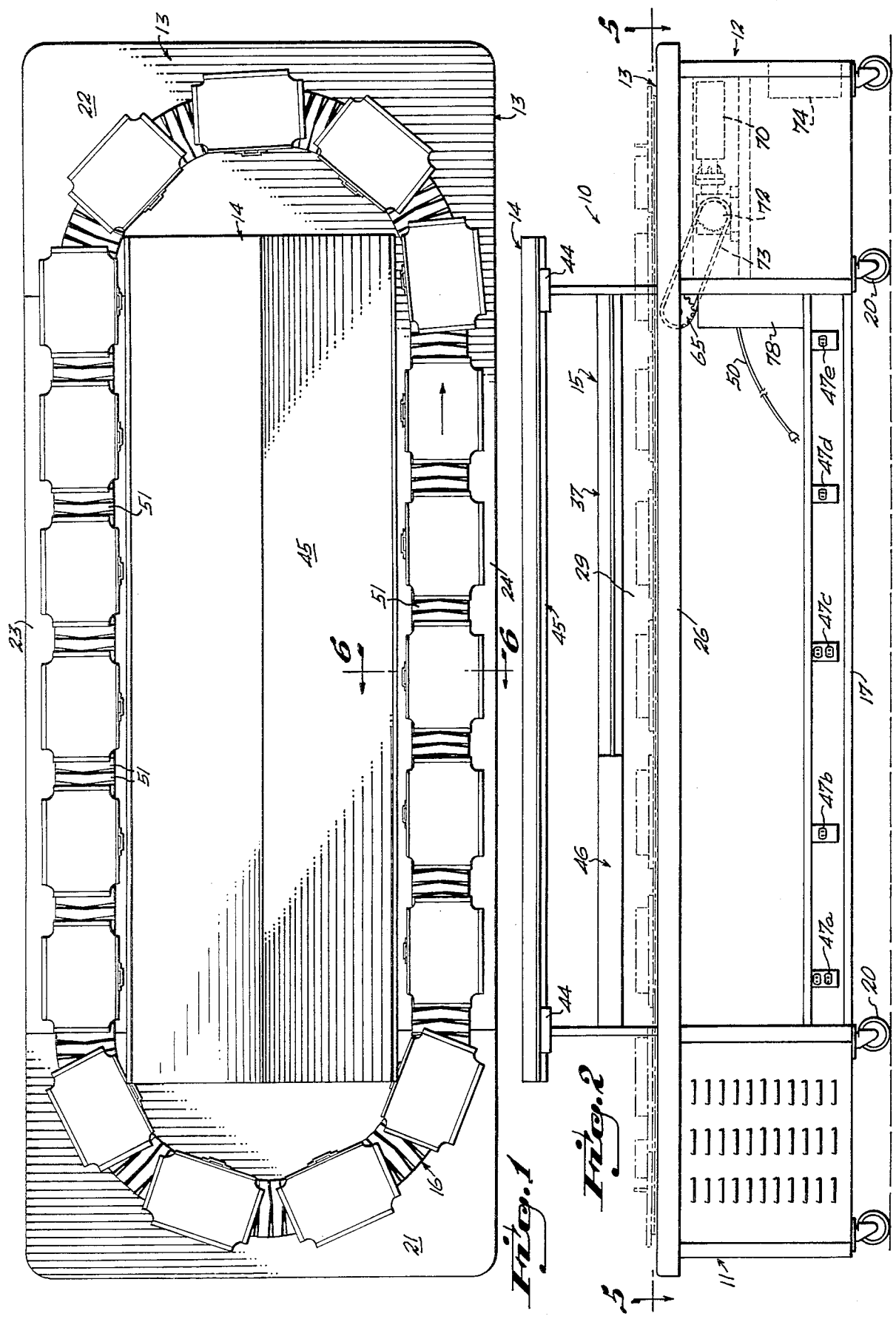

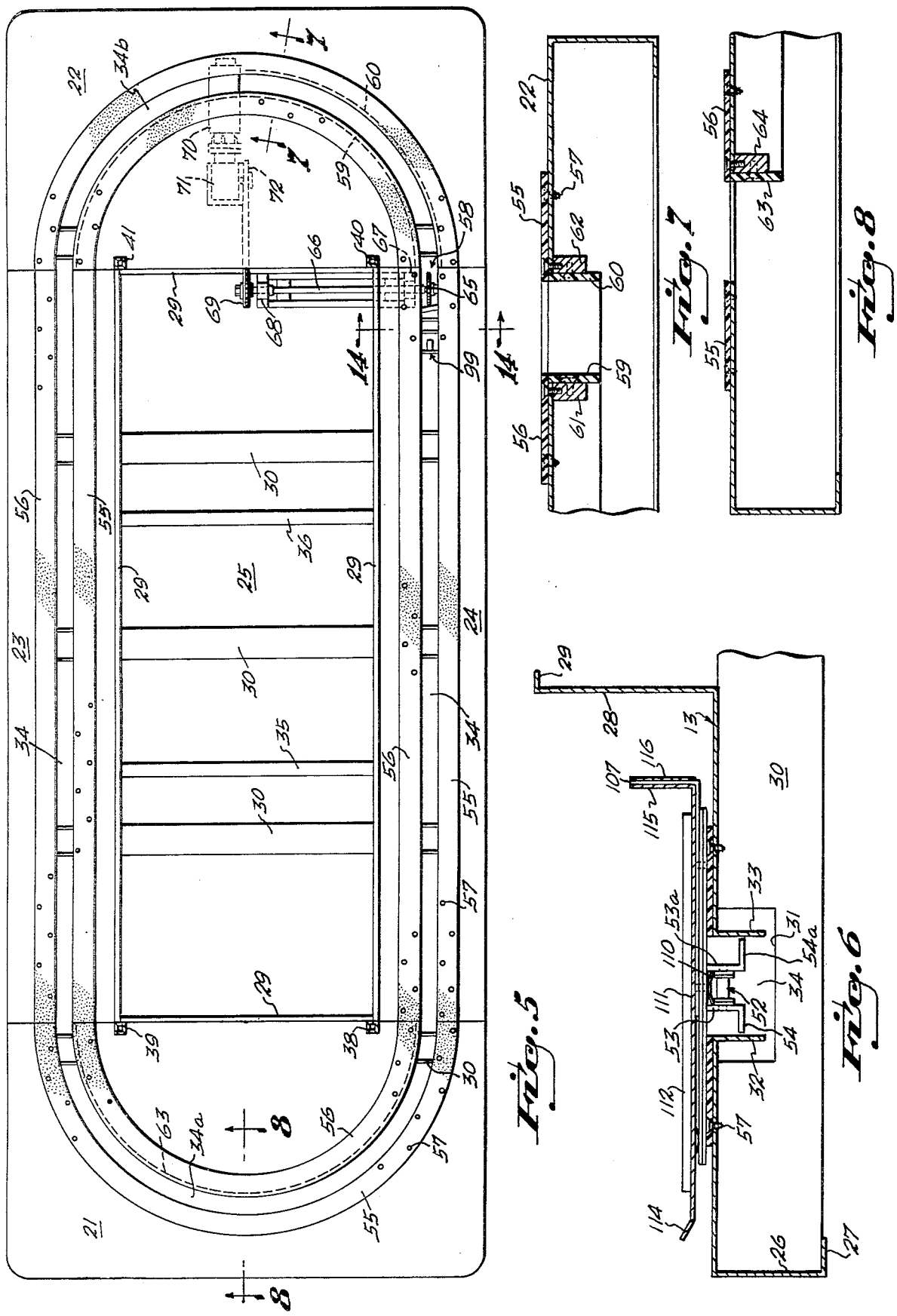

CIRCULAR FOOD SERVICE CONVEYOR

This invention relates to the make up of food trays for individual meal service and is directed particularly to a table top food service conveyor wherein the conveyor belt travels flat-wise in a generally circular path upon an elongated table top and carries, in closely spaced relation therealong, removable food trays conveniently located for loading with various food portions comprising the meal. Such continuous or circular food service conveyors are particularly useful in the make up of individual meal service trays in quantity or mass production, as may be used, for example, by airlines for the inflight serving of meals to passengers, or for meal service in schools, hospitals and other institutions where prepared meals are to be served in an efficient manner with minimum use of floor space.

It is, accordingly, the principal object of this invention to provide a novel and improved food service conveyor of the above nature which is readily adaptable for use with auxiliary food portion supply cabinets conveniently placed about the conveyor table for easy make-up loading of the individual trays as they are carried along their conveyor path.

A more particular object of the invention is to provide a food service conveyor of the character described wherein the tracking guide slot and the marginal table top surface portion at each side thereof, within and upon which the articulated conveyor belt rides, are so lined with surface portions having a low coefficient of friction as to minimize frictional drag in the movement of the conveyor upon the table top.

Another object of the invention is to provide food service conveyor of the above nature wherein interlocking of the articulated conveyor belt in its tracking slot is effected only at the position of engagement therewith of the conveyor drive sprocket wheel, and wherein release thereof can readily be accomplished for easy lift-out removal of the entire conveyor belt for cleaning, repair or replacement.

Yet another object of the invention is to provide a food service conveyor of the above nature including mechanism for automatically lubricating the articulated conveyor belt sprocket drive chain during its movement about the table top.

Yet another object is to provide a portable food service conveyor which will be self contained to include to the conveyor drive, food shelf refrigeration system and electrical service outlets for use with auxiliary hot and/or cold food portion supply cabinets and the like.

Still another object of the invention is to provide food service conveyor which will be simple in construction, attractive in appearance, compact, easy to maintain in sanitary condition, and durable in use.

Other objects, features and advantages of the invention will be apparent from the following description when read with reference to the accompanying drawings. In the drawings, wherein like reference numerals denote corresponding parts throughout the several views:

FIG. 1 is a top plan view of a circular food service conveyor embodying the invention;

FIG. 2 is a side elevational view thereof;

FIG. 5 is a top elevational view of the conveyor with the shelf canopy structure and conveyor belt assembly removed to reveal mechanical details of the conveyor tracking slot and conveyor drive mechanism;

FIG. 6 is a vertical cross-sectional view taken along the line 6—6 of FIG. 1 in the direction of the arrows;

FIG. 7 is a vertical cross-sectional view taken along the line 7—7 of FIG. 5 in the direction of the arrows;

FIG. 8 is a vertical cross-sectional view taken along the line of 8—8 of FIG. 5 in the direction of the arrows;

Figure 3:
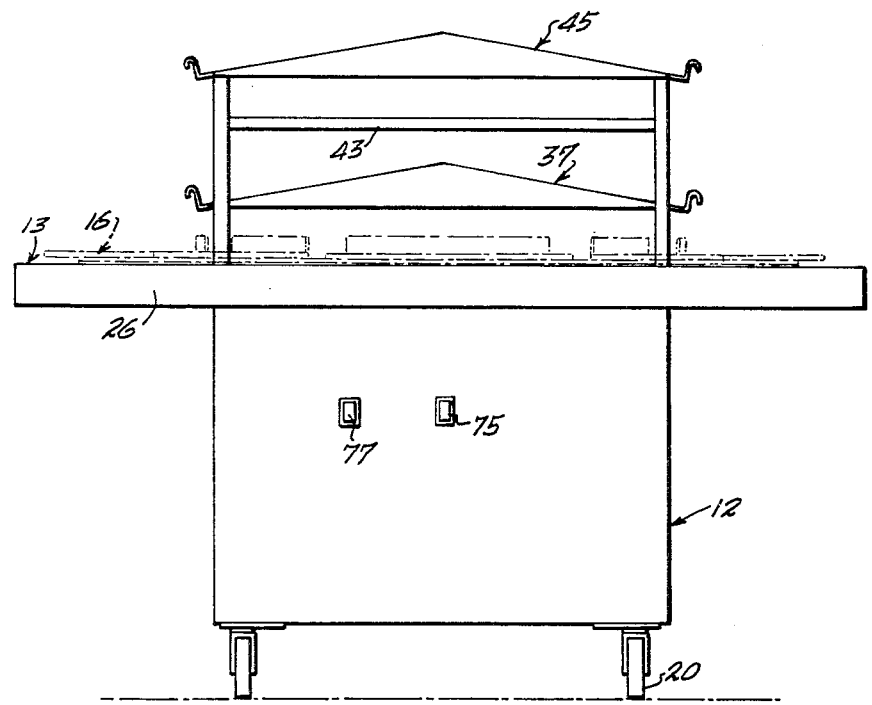
FIG. 3 is an end elevational view thereof, as seen from the right hand end as illustrated in FIG. 1.

Referring now in detail to the drawings, reference numeral 10 in FIGS. 1 and 2 designates, generally, a circular food service conveyor embodying the invention, the same comprising a pair of rectangular, spaced-apart, box-like pedestals 11, 12 supporting, from underneath at each end, a conveyor table top member 13. Upper and lower food holding shelves 14 and 15 are supported in spaced relation above a central portion of the conveyor table top 13 in the manner and for the purpose hereinafter more fully described. The conveyor table top 13 comprises tracking and drive means for an articulated conveyor belt 16, which travels in an elongated circular path upon the upper surface of the table top member in the manner and for the purpose hereinafter more particularly described.

Figure 4:
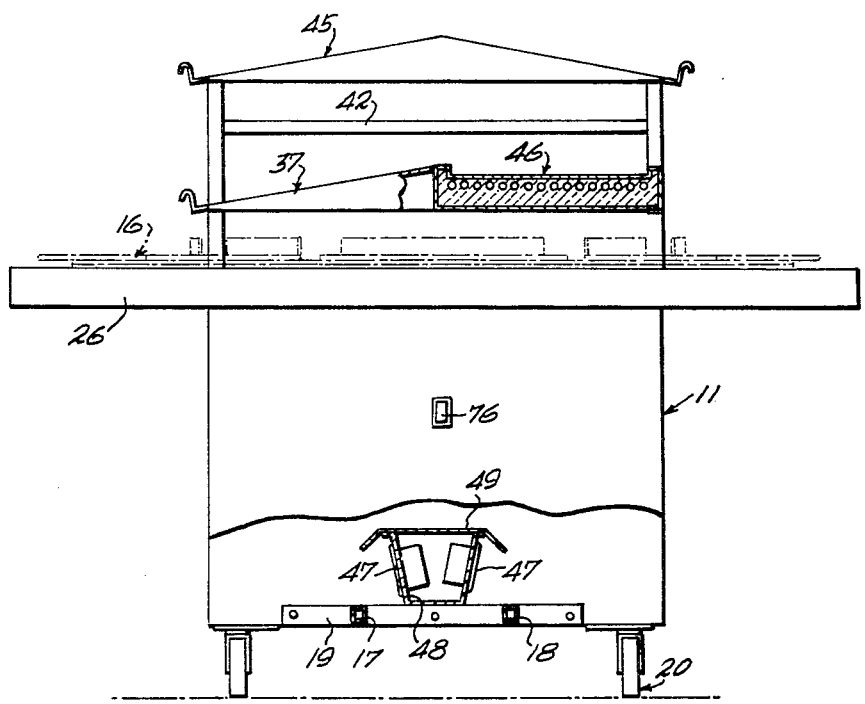
FIG. 4 is an end elevational view thereof, as seen from the left hand end as illustrated in FIG. 1, with portions broken away to illustrate constructional details.

The box-like support pedestals 11, 12 may be fabricated of sheet metal, stainless steel for example, over a tubular framework, and are secured in spaced apart relation as by a pair of rectangular tube spacer members 17, 18 at lower marginal end portions thereof. Thus, as illustrated in FIGS. 2 and 4, spacer members 17 and 18 are held in spaced, parallel relation at the ends thereof by transverse bar members 19, 19 (only one cross bar 19 illustrated in FIG. 4), said cross bars being bolted or otherwise attached to opposing lower marginal end portions of said support pedestals. The upper ends of the support pedestals 11, 12 are bolted or otherwise secured to underside portions of the table top member 13 to provide for a rugged, unitary conveyor support structure. Preferably, the four corners of each of the support pedestals 11, 12 are fitted with castor wheels 20 for rolling portability of the circular food service conveyor 10 as a unit.

The table top member 13, which is preferably fabricated of sheet stainless steel, comprises rectangular end portions 21, 22 interjoined by laterally-opposed, elongated table side portions 23, 24 all of which are welded together to provide a rigid table top having a central rectangular opening 25, as is best illustrated in FIGS. 2 and 6. The table top 13 is also integrally formed with an outer, peripheral, down-turned skirt 26 terminating in a comparatively short, inwardly-bent flange 27. The inner periphery of the table top 13 is integrally formed with a perpendicular, upstanding wall 28 terminating in a short, inwardly-extending flange portion 29 (see FIG. 6).

A plurality of transverse brace members 30 are welded or otherwise secured against the underside of the unitary conveyor table top member 13 for structural rigidity. As illustrated in FIG. 6, these brace members, where they pass under the hereinafter described conveyor tracking slot, are provided with rectangular cut-outs 31. As further illustrated in FIG. 6, the table side portions 23, 24 comprise central, elongated, down-turned portions 32, 33 (only side table portion 24 illustrated in FIG. 6) defining the longitudinally-extending conveyor belt tracking slot 34. As illustrated in FIG. 5, a pair of square tubing brace members 35, 36 are welded transversely between the spaced, parallel, upstanding wall portions 28 of the table top member 13 just below the flange portion 29 thereof, to provide for additional rigidity.

The upper in-turned flange 29 serves to support a first rectangular shelf 37 above the peripheral upstanding wall 28. Means is also provided for supporting a second rectangular shelf 45 in spaced relation above the first shelf 37. To this end, there is bolted or otherwise secured against end wall portions of the perpendicularly upstanding wall 28, opposed pairs of upstanding posts 38, 39, and 40, 41, braced by transverse brace members 42, 43, respectively, near their upper ends, said posts and brace members preferably being fabricated of square stainless steel tubing. The upper ends of the upstanding posts 38 through 41 have welded or otherwise secured thereto angular sheet metal saddles 44 upon which the second shelf member 45 is fitted and secured. As illustrated in FIGS. 2, 3, and 4, the shelf members 37 and 45 are formed with angular shelf surface portions extending to each side, upon which food portions may be placed preparatory to loading of the conveyor trays, as is hereinafter more particularly described. As illustrated in FIG. 4, the lower tray 37, by way of example, may be equipped with a refrigerated shelf section 46 for holding cold foods. Since the construction of such cooling shelves with the use of embedded refrigerator cooling coils is well known and is not claimed herein, further details are not deemed to be necessary other than to state that the refrigerant compressor and other operating mechanisms may conveniently be enclosed within the box-like support pedestal 11.

As illustrated in FIGS. 2 and 4, a plurality of electrical outlets 47a, 47b, 47c, 47d, 47e are provided along the length and at each side of the circular food service conveyor, being supported between the pedestals 11, 12 near the lower ends thereof. To this end, a U-shaped, elongated, bent sheet metal raceway 48 is secured between the pedestals 11, 12, in the side walls of which said electrical outlets 47a through 47e are installed in spaced relation therealong. A protective sheet metal cap member 49 is removably secured along the metal raceway 48. The raceway 48 contains the wiring to the refrigeration compressor in pedestal 11 for connection with circuitry including the electrical drive for the conveyor motor, hereinafter described, all of which may be energized by connection with a source of electrical power through flexible power conduit or cord 50.

Figure 9:
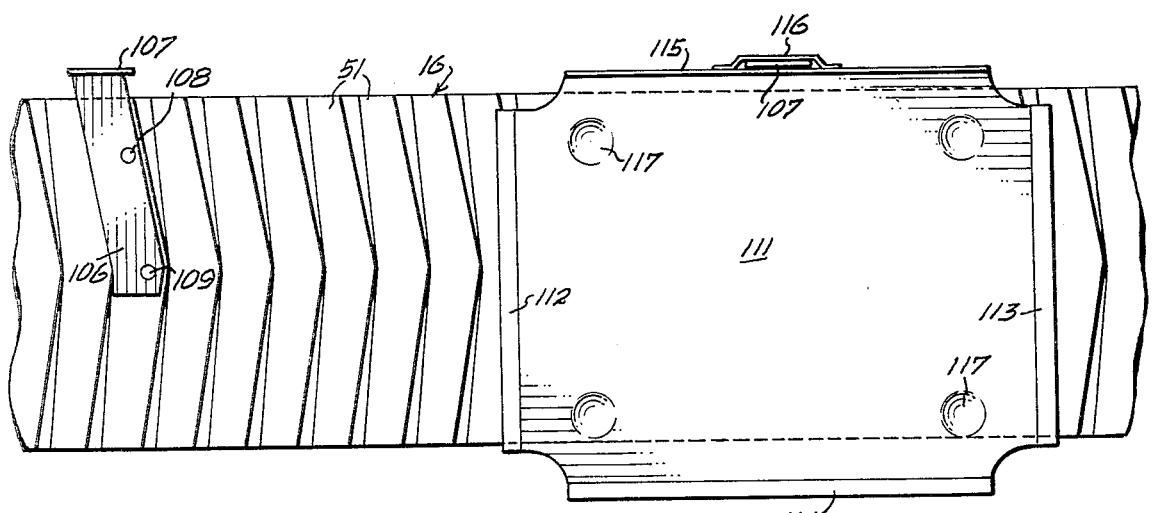
FIG. 9 is a partial top view of the articulated conveyor belt, illustrating the tray brackets fixed therealong in spaced relation for removable attachment of tray holders.
Figure 10:
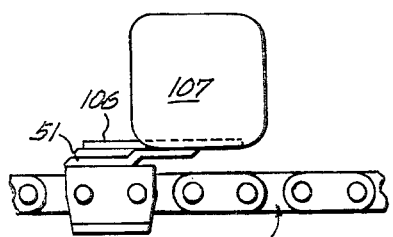
FIG. 10 is an end elevational view of one of the tray holder brackets illustrated in FIG. 9.
Figure 11:
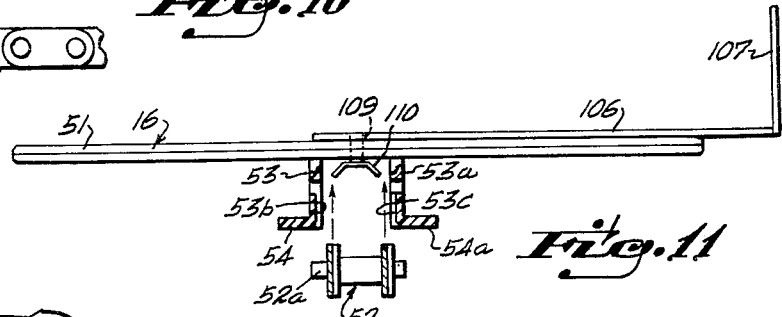
FIG. 11 is a side elevational view of one of the articulated slats comprising the conveyor belt, partly in section, illustrating how it connects with its drive chain, also shown in vertical cross-section.
Figure 13:
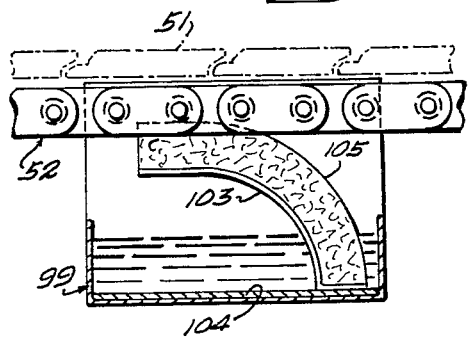
FIG. 13 is a vertical cross-sectional view of the drive chain lubricating mechanism of FIG. 12 taken along the line indicated at 13—13 of FIG. 12 in the direction of the arrows and shown in operating configuration.

As best illustrated in FIGS. 1, 9, and 11, the conveyor belt 16 comprises a plurality of articulated slat members 51 supported on a conveyor sprocket chain 52 (see also FIG. 13). Since the individual conveyor slat members 51 are of known construction and not separately claimed herein, no further description thereof is deemed to be necessary other than to state that they are designed to turn flat-wise as a conveyor belt to enable circular travel in the plane of the conveyor table top member 13. Also, as illustrated in FIG. 11, each slat member 51 is integrally formed with central, downwardly-extending support members 53, 53a terminating in outwardly-extending flange portions 54, 54a. The outer ends of the outwardly-extending portions 54, 54a are adapted to slide along side wall portions of the conveyor belt tracking slot 34 including down-turned side wall portions 32, 33 of the side table portions 23 and 24. Downwardly extending portions 53, 53a of slat members 51 are also provided, at opposed inner surface portions thereof, with vertical slots 53b, 53c terminating in through openings, adapted to interconnectingly receive end portions of individual sprocket chain cross-connector pins 52a.

As illustrated in FIG. 5, the conveyor belt tracking slots 34 at each side of the conveyor table top member 13 communicate at their ends with semicircular conveyor belt tracking slot portions 34a, 34b formed in table end portions 21, 22. As illustrated in FIGS. 1, 6, 7, 8, and 12, the conveyor table top member 13, at each side of the conveyor belt tracking slot portions 34, 34a and 34b, has secured thereupon as by countersunk screws 57, flat strips of TUFOLON or the like synthetic plastic material 55, 56, upon which underside portions of the conveyor belt slat members 51 slide as conveyor belt 16 moves in its circular path. The slide strips 55, 56 provide a low coefficient of sliding friction of the conveyor belt, thereby minimizing the drive power required in moving a loaded conveyor belt about its travel loop.

Sprocket wheel drive means, designated generally by reference numeral 58 in FIG. 5, is provided for driving the sprocket chain 52 of conveyor belt 16 when fitted in its table top belt tracking slot 34, 34a, 34b (see also FIG. 15), for moving said conveyor belt in the anti-clockwise direction as seen in FIGS. 1 and 5. As means for further reducing sliding friction of the conveyor belt, the tracking slot 34b, at its first quarter turn, is provided with opposed, downwardly-extending side wall strips 59, 60 of TUFOLON or the like (see FIG. 7) against which outer ends of outwardly-extending flange portions 54, 54a of the conveyor slot support members 53, 53a may slide. As further illustrated in FIG. 7, the arcuate side wall strips 59, 60 are supported by arcuate metal bars 61, 62 suitably attached to the underside of the table top end portion 22. It is to be noted that the inner side wall strip 59 together with its arcuate backing bar 61 continues through the remainder of the quarter circle of tracking slot 34b, whereas side wall strip 60 does not and need not extend beyond the first quarter circle. This is for the reason that the articulated conveyor belt, having its drive mechanism 58 just before the entrance to tracking slot 34b, will have a tendency to bunch up for a short distance in advance thereof so as to be pushed laterally outwardly against side wall strip 60. Once the conveyor belt reaches the second quarter turn of tracking slot portion 34b, it will have come under the influence of pulling from behind by sprocket chain 52, so that frictional abutment of the conveyor belt slat members 51 will be directed to the inside of the arcuate portions of the track. Thus, whereas, as illustrated in FIG. 8, an arcuate side wall strip 63 will also be required along the inside of tracking slot 34a, no abutment wall at all is required at the outer side of said tracking slot. As further illustrated in FIG. 8, an arcuate metal bar 64 is similarly used to support arcuate slide strip 63.

The sprocket wheel drive means 58 (see FIGS. 5 and 14) comprises a sprocket gear 65 carried at one end of a drive axle 66 journalled near each end in bearing blocks 67, 68 secured against the underside of the conveyor table top member 13 and with respect to table end portion 22. The drive axle 66 extends transversely of the table top member 13 and terminates in driven pulley sprocket 69. An electrical motor and gear reduction box assembly 70, 71 supported within pedestal 12 has an output drive gear pulley 72 drivingly connected with pulley sprocket 69 by drive belt 73. The electrical energization circuitry for the drive motor 70 includes a speed control box 74, and on-off push button switches 75, 76 in the outer end panels of pedestals 11, 12, respectively. A push button 77, also located in pedestal 12, in laterally spaced relation with respect to on-off push button switch 75, serves to switch the refrigerating system for the refrigerated shelf section 46 on and off. Since the electrical drive and speed control circuitry for the conveyor drive motor 70 are well known and not specifically claimed herein, further description is deemed to be unnecessary other than to say that such circuitry is fed by power conduit 50 through a panel box 78 (see FIG. 2) within which appropriate circuit breakers and the like are located for the various energization circuits comprising the above mentioned refrigerating system, electrical outlet receptacles 47a through 47e and the electric conveyor drive motor 70.

Figure 14:
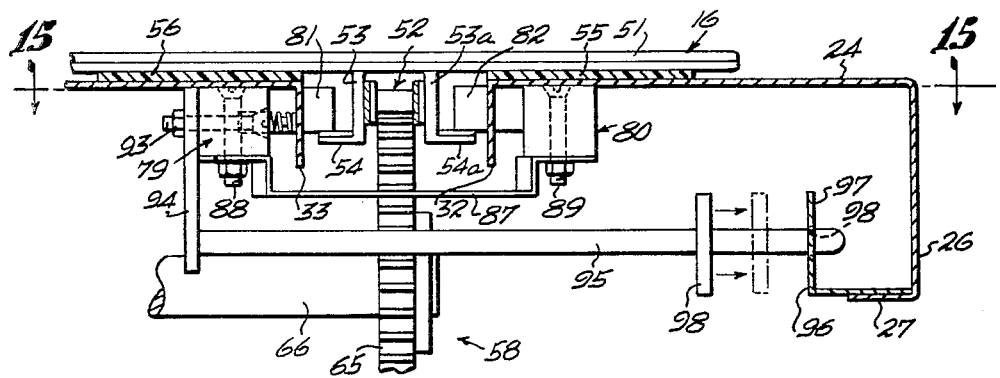
FIG. 14 is a vertical cross-sectional view taken along the line 14—14 of FIG. 5 in the direction of the arrows and illustrating mechanical details of the conveyor belt release mechanism.
Figure 15:
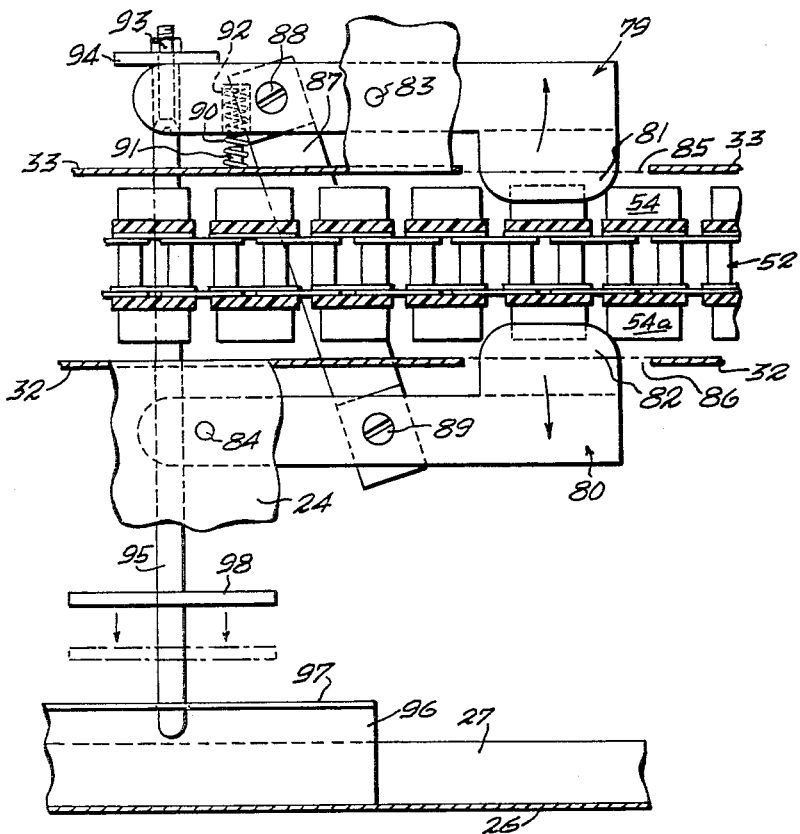
FIG. 15 is a plan view of the belt release mechanism illustrated in FIG. 14, taken below the plane indicated by the line 15—15 thereof.

Means is provided for releasably locking the conveyor belt 16 at the approximate position of interengagement of the sprocket chain 52 thereof with sprocket gear 65. To this end, as illustrated in FIGS. 14 and 15, the table top side portion 24 has a pivotally secured to the underside thereof at each side of conveyor tracking slot 34, a pair of elongated lock bars 79, 80 having opposed, inwardly-projecting end portions 81, 82, respectively, adapted to swing mutually inwardly so as to be in overlying relation above the outwardly-extending flange portions 54, 54a of the pertaining conveyor belt slat member 51. Elongated lock bar 79 is pivotally joined to the underside of the table top side portion 24 as by a pivot pin 83 journalling a central portion of said lock bar along its length, whereas lock bar 80 is pivotally joined with respect to the underside of said table top portion as by pivot pin 84 journalling an outer end portion of elongated lock bar 80. As illustrated in FIG. 15, the down-turned portions 32, 33 of the conveyor table top side portion 24 are provided with rectangular recesses 85, 86 for through passage of respective lock bar head portions 81, 82, respectively. The lock bars 79, 80 are further pivotally interconnected by a elongated, shallow U-shaped link member 87 which, at one end, is pivotally joined with the underside of lock bar 79 at a position approximately midway between pivot pin 83 and the distal end thereof, as by machine screw 88 and, at the other end to a central portion along the length of lock bar 80 as by machine screw 89. As best illustrated in FIG. 15, link member 87 is so shaped as to clear the downturned portions 32,33 of table top side portion 24.

Means is provided for normally resiliently constraining the lock bar members 79, 80 in their mutually inwardly-extending positions, as illustrated in FIGS. 14 and 15, whereat they interengage with the conveyor slat members 51 as described above. To this end, a helical compression spring 90 seated at one end upon a pin 91 welded or otherwise secured to the outside of downturned portion 33 of table top side portion 24, has its other end seated with a cylindrical recess 92 provided in lock bar 79 located at the side of pivot pin 83 opposite head portion 81. Lock bar 79 will thus normally be constrained in the clockwise or conveyor locking position as illustrated in FIGS. 14 and 15. At the same time, the link member 87 so interconnects the lock bars 79 and 80 in their cooperative relative movement that lock bar 80 will also be in its inward conveyor belt locking position.

As means for releasing the above described conveyor belt locking mechanism, the distal end of the lock bar 79 has fixed thereto, as by machine bolt 93, downwardly-extending bracket bar 94, against the lower end of which is welded or otherwise secured a pull rod 95 extending laterally towards the outer edge of table top portion 24. An angle bracket member 96 fixed upon an upper surface portion of table top portion flange 27, has an upstanding portion 97 provided with a circular opening 98 through which the distal end of pull rod 95 is slidingly disposed. Fitted upon and secured to the pull rod 95 in spaced relation to the distal end thereof, is a cross-piece or handle 98 which may readily be reached by the operator for pulling said rod towards the outer edge of the table top against the yielding reaction of compression spring 91. By manipulating pull rod 95, the lock bar 79 will be rotated anti-clockwise about its pivot pin 83, as indicated by the arrow, while, at the same time, link 87 will be moved in the outward direction (downwardly as illustrated in FIG. 15) to simultaneously rotate the lock bar 80 in the clockwise direction, as indicated by the arrow. Release for removal of the conveyor belt 16 is thus readily accomplished by reaching under the conveyor talbe top side portion 24 and pulling outwardly upon pull rod 95.

Figure 12:
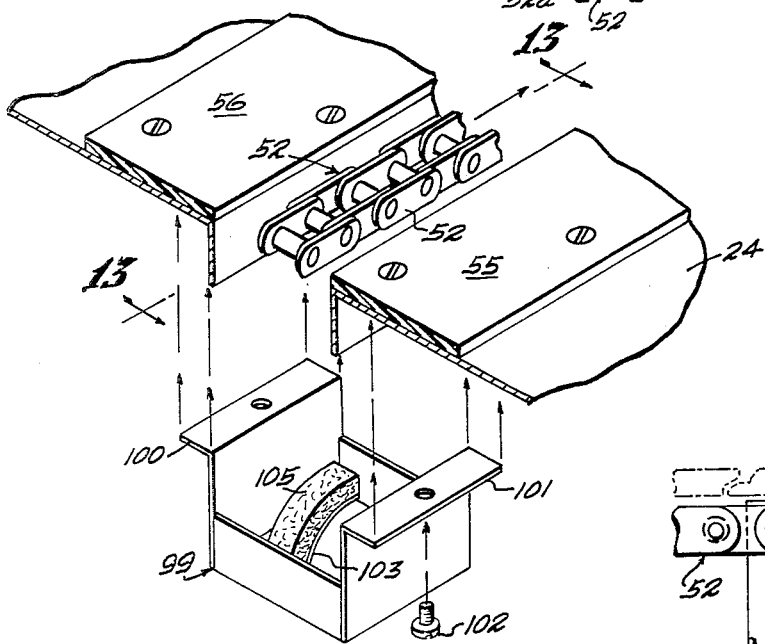
FIG. 12 is a partial cross-sectional "exploded" view of the conveyor sprocket chain and associated tracking slot illustrating the self lubricating mechanism.

Means is provided for automatically lubricating conveyor sprocket chain 52 while it is in use. To this end, as illustrated in FIGS. 5, 12, and 13, the conveyor table top portion 24 has secured to the underside thereof, in straddling relation with respect to the conveyor tracking slot 34, a rectangular bent sheet metal oil reservoir 99. The open top of the lubricating oil reservoir 99 is provided with opposed, outwardly-extending flanges 100, 101 provided with central screw holes for attachment to the table top side portion 24 as by machine screws 102. An arcuate leaf spring 103 fixed to a rectangular base plate 104 seated against the bottom of box-like reservoir 99 has cemented or otherwie secured thereto, a thick wick of felt or other absorbent material 105. As illustrated in FIG. 13, the outer end of arcuate leaf spring 103 resiliently urges the lubricating wick 105 against the underside of the conveyor drive sprocket chain 52, the outer end of said wick extending in the direction of travel of said sprocket chain.

Means is provided for removably supporting tray holders 111 in spaced relation upon the conveyor belt 16. To this end, as illustrated in FIGS. 6, 9, 10 and 11, a plurality of bent sheet metal tray holder support brackets 106 are secured, as by a pair of rivets 108, 109, to individual slats of the conveyor. The inner ends of the support brackets 106, which extend just beyond the inner end of the articulated conveyor belt 16, are formed with rectangular, upwardly-bent support portions 107, which serve as support means for the tray holders as is hereinafter described.

As illustrated in FIGS. 6 and 11, the bracket attachment rivet 109 extends through the lateral center of its associated conveyor slat 51 and attachingly supports, at the underside of said slat, a spring metal brush 110 which, as illustrated in FIG. 6, makes contact with conveyor sprocket chain 52 for electrically grounding the conveyor belt and tray holder assembly to the remainder of the conveyor housing support structure. Static electricity electrical charges which might otherwise be generated in the moving conveyor belt mechanism are thus continually dissipated, to preclude any possibility of static electricity shock to those handling the tray holders or trays being supported thereon.

As best illustrated in FIG. 9, the tray holders 111 are preferably formed of sheet stainless steel, of generally rectangular shape, and are provided with obliquely upturned side edge portions 112, 113 and front edge portion 114. The tray holder 111 is also formed with a comparatively long, right-angularly upturned rear wall portion 115 against the outer surface of which is spot welded or otherwise secured, at a central position therealong, an elongated, shallow U-shaped bracket member 116 defining an elongated slot adapted to receive, in interfitting engagement, one of the tray holder bracket support portions 107. Thus, as illustrated in FIGS. 1 and 9, individual tray holders 111 can be removably attached to the conveyor belt 16 in spaced relation therealong for use in supporting food trays, (not illustrated) to be loaded with food portions in assembly line fashion from food supply shelves 37 and 45 and prepared food holding cabinets appropriately placed about the food service conveyor as hereinabove described. Preferably, the tray holders 111 will be formed with downwardly-extending corner projections 117, which may be circular concavities for example, which serve to space the under-surface of said tray holders above upper surface portions of the articulated conveyor belt, thereby minimizing sliding friction therebetween, especially upon passage of the conveyor belt about its arcuate end portions.

While there is illustrated and described herein only one form in which the invention can conveniently be embodied in practice, it is to be understood that this form is presented by way of example only and not in a limiting sense. The invention, in brief, comprises all the embodiments and modifications coming within the scope and spirit of the following claims.

What is claimed is:

1. A circular food service conveyor comprising, in combination, a table top, means for supporting said table top in vertically spaced relation above a floor, a continuous tracking slot in said table top and disposed in laterally spaced relation with respect to the outer peripheral edge thereof, a conveyor belt loop, said conveyor belt loop comprising a plurality of substantially rigid, flat, elongated slat members, means articulating said slat members in longitudinal edge to longitudinal edge relation in such manner that they are capable of arcuate movement in a common plane, said conveyor slat articulating means comprising central, downwardly-extending support means integrally formed with each of said slat members and a continuous drive chain interconnecting said slat support means, said downwardly-extending slat support means together with said continuous drive chain being receivable in said table top tracking slot so that the remainder of said articulated conveyor slat members will be seated upon the upper surface of said table top for circuitous movement therealong, rotary drive means engagable with said drive chain for moving said articulated conveyor belt along said table top tracking slot, said rotary drive means comprising a drive gear intermeshed with said drive chain, and means for releasably locking the conveyor slat connected to said drive chain portion intermeshed by said drive gear in said tracking slot to constrain said slat to tracking movement therealong, said releaseable conveyor slat locking means comprising a pair of laterally-outwardly-extending, opposed flange portions integrally formed with the downwardly-extending support means of each of said slat members, and a pair of lock bars moveable between a first position at which they overlie, respectively, upper surface portions of said outwardly-extending flange portions, and a second position whereat they are laterally removed from such overlying positions, resilient means normally constraining said locking bars in said first position, and manually controllable means for temporarily moving them to their second position to enable upward withdrawal and removal of said articulated conveyor.

2. A circular food service conveyor as defined in claim 1 wherein said table top is fabricated of sheet metal, and wherein marginal portions at each side of said tracking slot have secured thereto flat strips of synthetic plastic material having a low coefficient of sliding friction, upon which laterally opposed portions of said articulated conveyor belt seat and ride.

3. A circular food service conveyor as defined in claim 1 including means for automatically lubricating said drive chain from underneath said table top.

4. A circular food service conveyor as defined in claim 2 wherein said table top is of elongated, rectangular configuration, and said continuous tracking slot comprises straight runs along each side thereof and arcuate runs in the ends thereof, said continuous tracking slot comprising downturned side wall portions, said downwardly-extending support means of each of said slat members comprising a pair of laterally outwardly-extending, opposed flange portions integrally formed therewith, the outer edges of which are adapted to be slidingly guided by said downturned side wall portions.

5. A circular food service conveyor as defined in claim 4 wherein said downturned side wall portions of said arcuate runs of said tracking slot are covered with arcuate strips of synthetic plastic material having a low coefficient of sliding friction, against which the outer edge of said flange portions ride.

6. A circular food service conveyor as defined in claim 4 wherein said table top supporting means comprises a pair of box-like support pedestals, one supporting each end of said table.

7. A circular food service conveyor as defined in claim 6 including a pair of food support shelf members secured in vertically spaced relation above and along an elongated central portion of said table top.

8. A circular food service conveyor as defined in claim 7 wherein said rotary drive means comprises an electric motor housed in one of said support pedestals and having a rotary drive output means, a drive gear intermeshed with said drive chain, and drive belt means mechanically interconnecting said rotary drive output means with said drive gear.

9. A circular food service conveyor as defined in claim 8 wherein one of said food support shelf members comprises electrical refrigerant cooling coils, and a refrigerating system housed in the other of said pedestals and including said refrigerant cooling coils.

10. A circular food service conveyor as defined in claim 8 including a plurality of rectangular tray holders and means for movably supporting said tray holders in spaced relation upon said conveyor belt.

11. A circular food service conveyor comprising, in combination, a table top, means for supporting said table top in vertically spaced relation above a floor, a continuous tracking slot in said table top and disposed in laterally spaced relation with respect to the outer peripheral edge thereof, a conveyor belt loop, said conveyor belt loop comprising a plurality of substantially rigid, flat, elongated slat members, means articulating said slat members in longitudinal edge to longitudinal edge relation in such manner that they are capable of arcuate movement in a common plane, said conveyor slat articulating means comprising central, downwardly-extending support means integrally formed with each of said slat members and a continuous drive chain interconnecting said slat support means, said downwardly-extending slat support means together with said continuous drive chain being receivable in said table top tracking slot so that the remainder of said articulated conveyor slat members will be seated upon the upper surface of said table top for circuitous movement therealong, rotary drive means engagable with said drive chain for moving said articulated conveyor belt along said table top tracking slot, said rotary drive means comprising a drive gear intermeshed with said drive chain, and means for releasably locking the conveyor slat connected to said drive chain portion intermeshed by said drive gear in said tracking slot to constrain said slat to tracking movement therealong, means for automatically lubricating said drive chain from underneath said table top, said automatic lubricating means comprising an oil reservoir secured beneath said table top in straddling relation with respect to said tracking slot, a wick extending outwardly of the bottom of said reservoir, and an arcuate leaf spring supporting an outer end portion of said wick in arcuate abutting relation against the underside of said drive chain.

* * * * *